United States Patent [19]

Haga et al.

[11] Patent Number: 5,749,005
[45] Date of Patent: May 5, 1998

[54] INFORMATION SETTING AND DISPLAYING DEVICE FOR A CAMERA

[75] Inventors: Masaaki Haga; Katsuki Machida; Hideaki Tsuji, all of Tokyo, Japan

[73] Assignee: Asahi Kogaku Kogyo Kabushiki Kaisha, Tokyo, Japan

[21] Appl. No.: 480,329

[22] Filed: Jun. 7, 1995

[30] Foreign Application Priority Data

Jun. 9, 1994 [JP] Japan .................................. 6-151489

[51] Int. Cl.$^6$ .................................................. G03B 17/18
[52] U.S. Cl. .................................................. 396/287
[58] Field of Search .......................... 354/465, 471, 354/474, 475, 289.1, 289.11, 289.12; 396/292, 287, 281, 543

[56] References Cited

U.S. PATENT DOCUMENTS

| | | | |
|---|---|---|---|
| 3,623,409 | 11/1971 | Uno et al. .................................. 95/10 |
| 3,947,862 | 3/1976 | Watanabe et al. ....................... 396/223 |
| 4,426,142 | 1/1984 | Iura et al. .................................. 354/412 |
| 4,497,564 | 2/1985 | Meguro et al. ........................... 354/442 |
| 4,534,640 | 8/1985 | Ito et al. .................................... 354/448 |
| 4,598,986 | 7/1986 | Shiratori et al. ........................... 354/21 |
| 4,674,854 | 6/1987 | Kawamura et al. .................... 354/289.1 |
| 4,678,306 | 7/1987 | Kiuchi ....................................... 354/217 |
| 4,692,008 | 9/1987 | Arakawa et al. ......................... 354/217 |
| 5,162,833 | 11/1992 | Taka ....................................... 354/289.12 |
| 5,210,569 | 5/1993 | Harada .................................... 354/442 |
| 5,223,888 | 6/1993 | Fukahori .................................. 354/475 |
| 5,241,334 | 8/1993 | Kobayashi et al. ..................... 354/195.1 |
| 5,283,606 | 2/1994 | Konno et al. ............................ 354/289.1 |
| 5,479,237 | 12/1995 | Kitaoka .................................... 354/474 |
| 5,485,238 | 1/1996 | Miura et al. ........................... 354/289.12 |
| 5,521,671 | 5/1996 | Aoki et al. ............................. 354/289.1 |
| 5,557,361 | 9/1996 | Inoue et al. ............................ 354/289.1 |

*Primary Examiner*—Safet Metjahic
*Assistant Examiner*—Christopher E. Mahoney
*Attorney, Agent, or Firm*—Greenblum & Bernstein P.L.C.

[57] ABSTRACT

An information setting and displaying device for a camera, has a ring-like rotary dial rotatably mounted in an adjustable manner on a camera body. A display member includes at least a pair of display sub-areas arranged inside the rotary dial and successively along an inner periphery of the rotary dial. An information setting mechanism changes information in a predetermined order responsive to rotation of the dial. A display control mechanism displays current set information in one of the display sub-areas, and displays proposed information, to be set as the rotary dial rotates, in the direction from the current display sub-area toward another display sub-area.

29 Claims, 12 Drawing Sheets

INFORMATION SETTING AND DISPLAYING DEVICE FOR A CAMERA

BACKGROUND OF THE INVENTION

1. Field of the invention

The present invention relates to an information setting and displaying device for a camera.

2. Description of Related Art

An information setting and displaying device has already been used in the field of single-lens reflex cameras, in which information such as a shutter speed and a diaphragm stop is set by operating a rotary dial or the like. Information set in this manner is displayed on a display member such as a liquid crystal display panel so as to be visually checked by an operator.

The conventional information setting and displaying device mentioned above is provided with a single display area in which a current set value is displayed. It is, however, impossible for the operator to know prior to adjusting the dial how the value in the display area will change as the rotary dial rotates. Consequently, the operator must rotate the rotary dial in a selected direction to check the changed value. If the rotary dial was not rotated in a proper direction, the rotary dial must then be returned to its starting position and then rotated in the reverse direction. Therefore, the conventional information setting and displaying device is difficult to handle.

SUMMARY OF THE INVENTION

It is a primary object of the present invention to provide an improved information setting and displaying device for a camera that allows an operator to visually determine prior to actual operation of adjustment how the current set information will change depending on the direction in which the rotary dial rotates.

To achieve the object mentioned above, according to the present invention, there is provided an information setting and displaying device for a camera comprising, a ring-like rotary dial rotatably mounted in an adjustable manner on a camera body. A display member includes at least a pair of display sub-areas arranged inside the rotary successively along an inner periphery of the rotary dial. An information setting mechanism changes information in a pre-determined order by operating the rotary dial. A display control mechanism displays a current set information in one of the display sub-areas, and displays proposed information to be set as the rotary dial is rotated in the direction from one display sub-area toward the other display sub-area by at least one step in toward another digital value display sub-area.

According to another embodiment of the present invention, there is provided an information setting and displaying device for a camera comprising, a ring-like rotary dial rotatably mounted in an adjustable manner on a camera body. A display member includes at least a pair of display sub-areas arranged inside the rotary dial successively along an inner periphery of the rotary dial. A memory holds digital information, changeable by operating the rotary dial, in the form of digital value tables, each table containing a plurality of digital values arranged in a predetermined order. A setting mechanism reads information by operating the rotary dial, from the memory and changing the information in a predetermined order. A display control mechanism displays a current digital information value set by the setting means in one of the display sub-areas, and displays a digital value to be set by the setting mechanism as the rotary dial is rotated in the direction from one display sub-area toward the other display sub-area, in the other display sub-area.

According to still another embodiment of the present invention, there is provided an information setting and displaying device for camera comprising, a ring-like rotary dial rotatably mounted in an adjustable manner on a camera body. A display member provided inside the rotary dial includes at least a pair of display sub-areas arranged in parallel along an inner periphery of the rotary dial. A storage mechanism holds information, changeable by operating the rotary dial in the form of tables, each table containing a plurality of values arranged in a predetermined order, a means for setting the information by operating the rotary dial. A display control mechanism displays a currently set information value in one of the display sub-areas, and displays a value directly adjacent to the current value in the associated one of the tables in the other display sub-area so that the value displayed in the one display sub-area may be transferred to the other display sub-area along the direction in which the rotary dial is rotated.

According to a further embodiment of the present invention, there is provided an information setting and displaying device for a camera comprising a ring-like rotary dial rotatably mounted in an adjustable manner on a camera body. A display member provided inside the rotary dial includes at least a pair of display sub-areas arranged in parallel along an inner periphery of the rotary dial. A storage mechanism holds information, changeable by operating the rotary dial, in the form of tables, each table containing a plurality of values arranged in a predetermined order. A setting mechanism sets information by operating the rotary dial. A display control mechanism displays a currently set information value in the current value display sub-area, reads from the storage means an information value to be set as the rotary dial is rotated from the proposed value display sub-area toward the current value display sub-area, and displays this information value in the proposed value display sub-area.

The present disclosure relates to subject matter contained in Japanese patent application No. 06-151489 (filed on Jun. 9, 1994) which is expressly incorporated herein by reference in its entirety.

DESCRIPTION OF THE PREFERRED EMBODIMENTS

The information setting and displaying device of the present invention will be described specifically as applied to a single-lens reflex camera in reference with the accompany in drawings.

Figure 1:
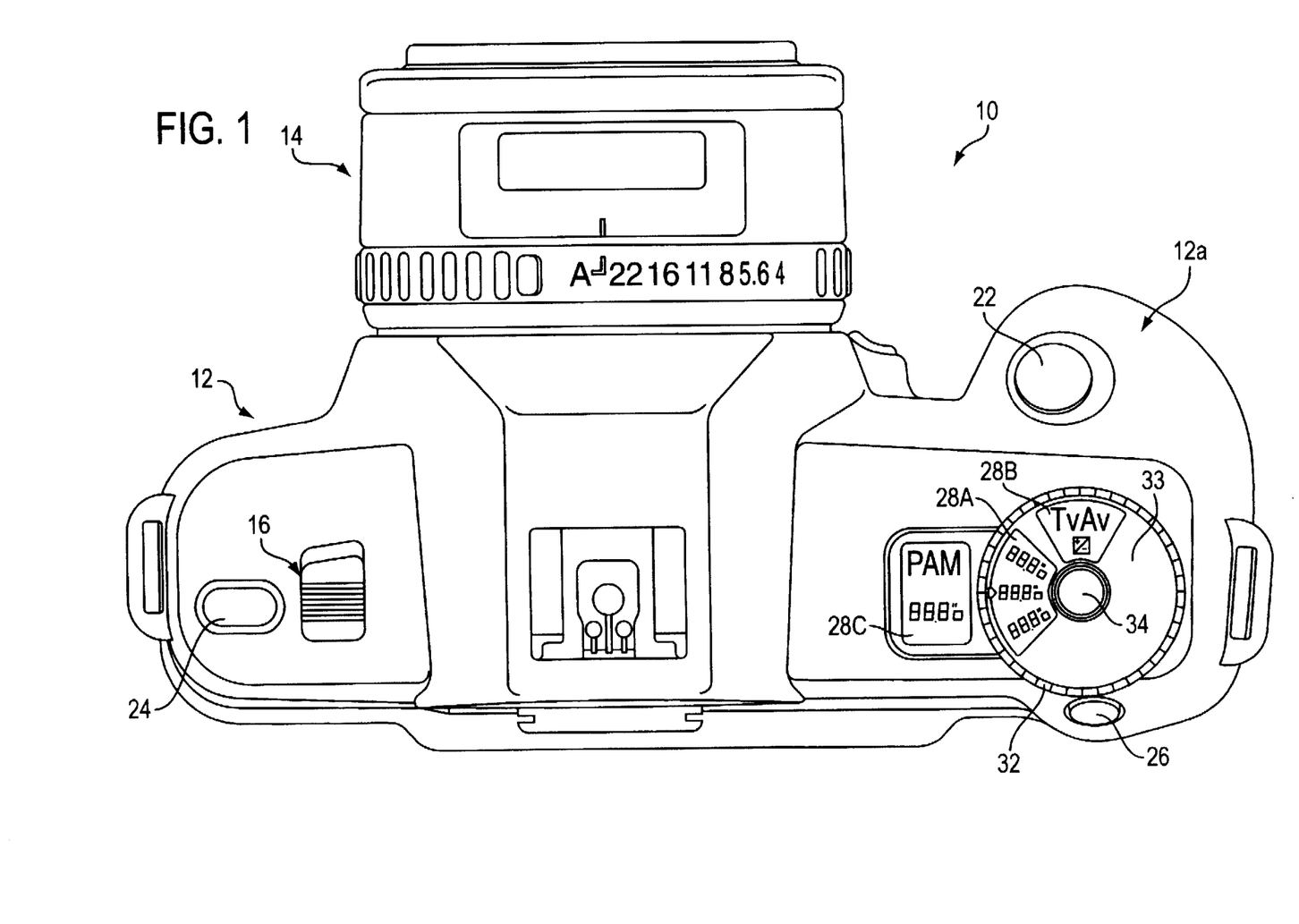
FIG. 1 is a plan view showing an outer appearance of a single-lens reflex camera to which the information setting and displaying device of the invention is applied.

As shown in FIG. 1, a single-lens reflex camera 10 generally comprises a camera body 12 and a photographic taking lens 14 mounted detachably on the camera body 12.

The camera body 12 is provided on its top surface with a main switch 16, a mode button 24, and a grip portion 12a. The grip portion 12a is provided with a release button 22.

A ring-like rotary dial 32, positioned behind the release button 22, is mounted around a locking member 33 fixed to a camera body 12 so that the rotary dial itself 32 can adjustably rotate relative to the camera body 12. A display member includes first and second display panels 28A, and 28B provided in a space defined by the locking member 33, in its center surrounded by the rotary dial 32 and a third display panel 28c provided closely adjacent to the outer periphery of the rotary dial 32. The rotary dial 32 is provided with a mode change button 34. Immediately behind the rotary dial 32, an exposure compensating button 26 is provided on a rear side of the camera body.

Figure 2:
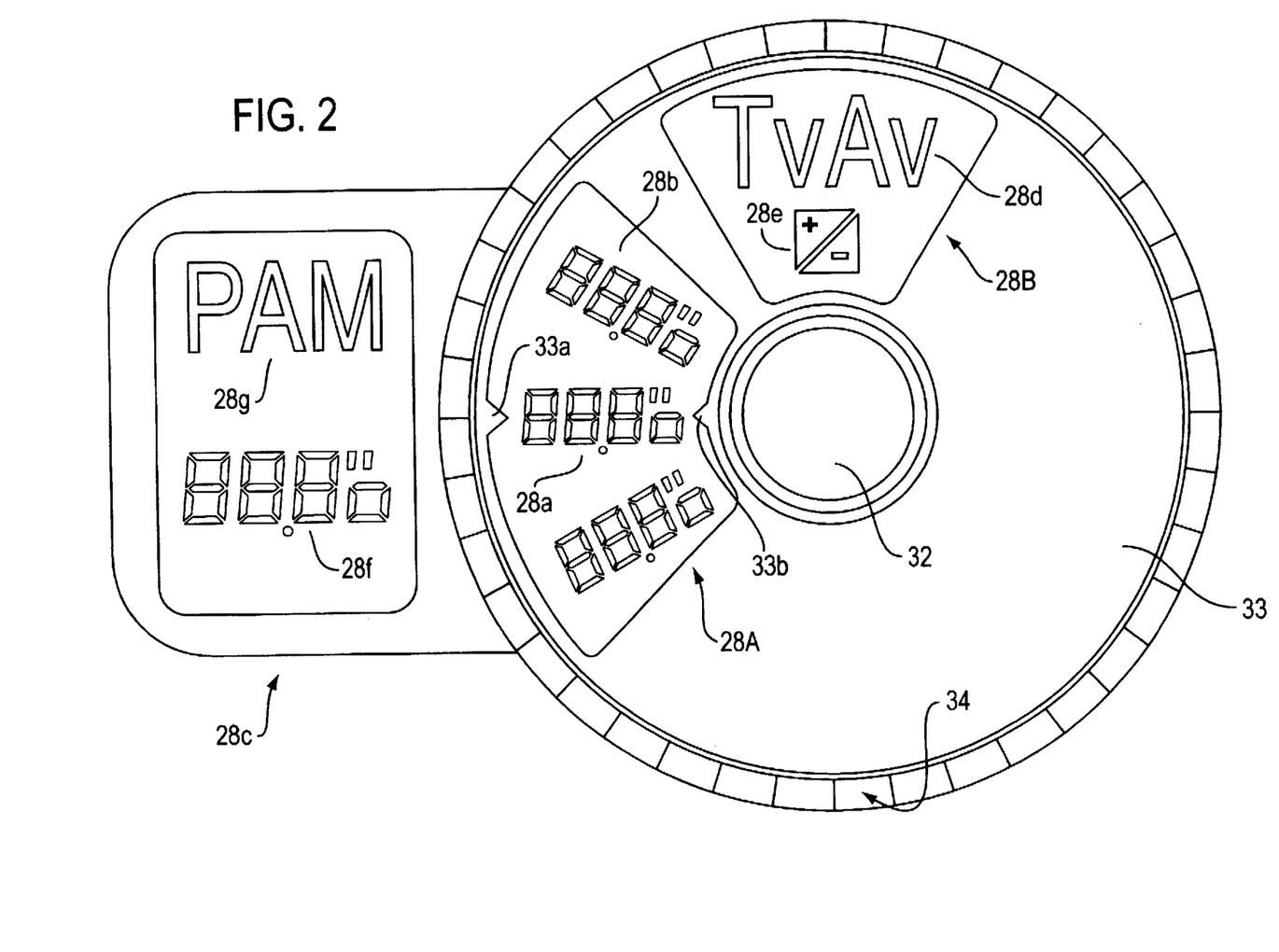
FIG. 2 is a plan view showing, in an enlarged scale, of a rotary dial and a display panel as seen in FIG. 1.

As apparent from FIG. 2, the first display panel 28A has a dial display area comprising three digital value display sub-areas 28a, 28b and 28c radially arranged successively along the inner periphery of the rotary dial 32 and displays digital information which changes by operating rotary dial 32.

In the dial display area, the central digital value display sub-area 28a serves as a first current value display sub-area for displaying a current set value. The upper digital value display sub-area 28b serves as a first proposed value display sub-area for displaying a digital value to be set as the rotary dial 32 is rotated by one step counterclockwise (shown in FIG. 1). The lower digital value display sub-area 28c serves as a second proposed value display sub-area to display a digital value to be set as the rotary dial 32 is rotated by one step clockwise (as shown in FIG. 1).

The locking member 33 is formed with indices and 33b projecting in the first display panel 28A pointing toward the current value display sub-area 28a of the first display panel 28A.

The second display panel 28B comprises an exposure mode mark display sub-area 28d adapted for selectively displaying a diaphragm priority mark "Av" and a shutter priority mark Tv. An exposure compensation mark display sub-area 28e is adapted to display an exposure compensation mark "±".

The third display panel 28C comprises a second current value display sub-area 28f for independently displaying a current value of the digital information which does not change by operating the rotary dial, and a photographing mode display sub-area 28g adapted for selective display of letters "P", "A" and "M".

While, for better understanding, the respective display panels, shown in FIGS. 1 and 2, have all segments turned on, it should be understood that these segments are normally partially and selectively turned on during actual use so that desired information is displayed, as will be described below in more detail.

Figure 3:
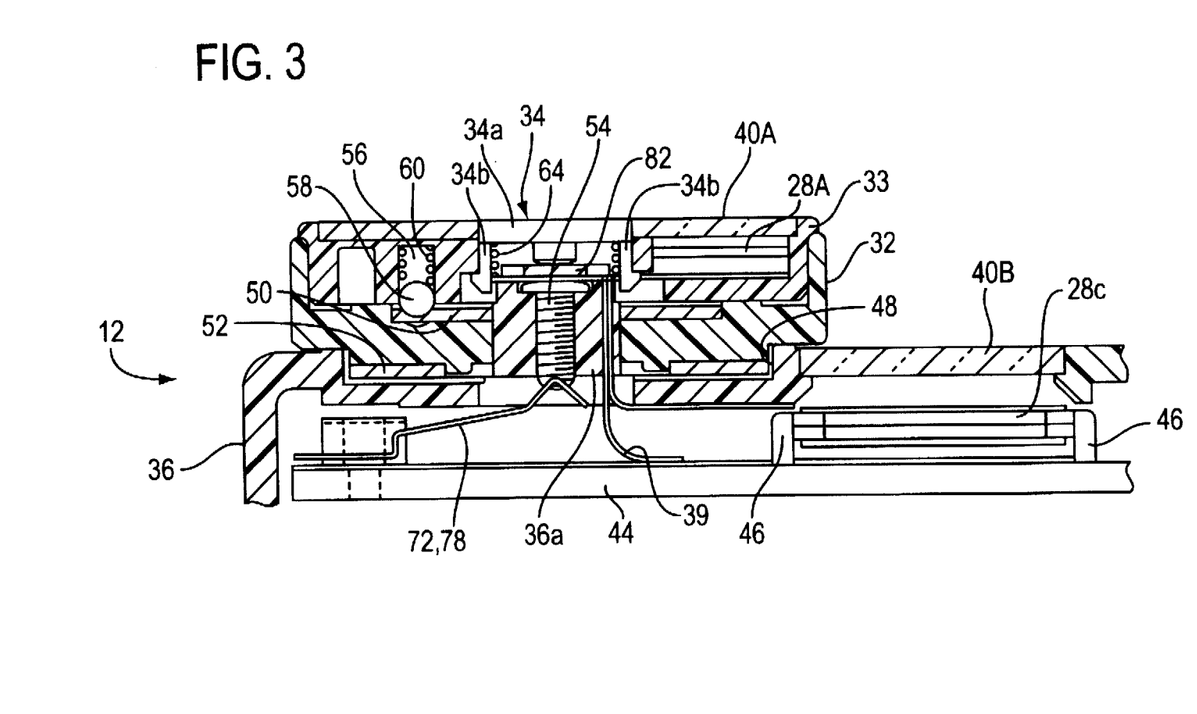
FIG. 3 is a sectional view showing the camera of FIG. 1 in the proximity of the rotary dial.

FIG. 3 is a sectional view taken along a plane of the camera in the proximity of the rotary dial 32. A top decorative member 36 covering the top surface of the camera body 12 has a recess 48 centrally formed with a shaft 36a extending upward.

The rotary dial 32 is rotatable around the shaft 36a. Its position is stabilized by the locking member 33, fixed to the shaft 36a by a bolt 54 to cover the rotary dial from above.

A ring-like click plate 50 is fixed to the upper side, as viewed in FIG. 3, of the rotary dial 32. The click plate 50 is formed in its upper surface adjacent to its outer periphery with twelve click grooves at regular intervals of 30°. The locking member 33 is formed at the left side, as viewed in FIG. 3, with a click ball receiving hole 56 adapted to be aligned with one of the twelve click grooves to thereby hold a click ball 58.

The click ball 58 is normally biased by a spring 60 toward the click plate. Such a click mechanism allows the rotary dial 32 to lock every rotation by an angle of 30°. The click feeling allows an operator to perceive completion of each stepwise rotation by the angle of 30°.

The locking member 33 is provided at its right side, as viewed in FIG. 3, with the first display panel 28A covered with a transparent member 40 and centrally provided on its upper side with the mode change button 34.

The mode change button 34 is integrally provided with a disc-like button head 34a having a top surface exposed to the exterior and a button shank 34b extending downward from the bottom surface of the button head 34a. Between the locking member 33 and the button head 34a, a spring 64 biases the mode change button 34 to project out from the rotary dial 32. The button shank 34b engages with the locking member 33 to prevent the mode change button 34 falling off from the rotary dial 32.

The mode change button 34 as a whole is located at the central portion of the rotary dial 32 and is vertically movable.

Upon depression, a mode change switch 82 underlying the mode changer button 34 is turned ON.

The third display panel 28C is fixed to an inner base plate 44 by fixing stays 46 and is visible through a transparent member 40B. Both the switch and the display panel located inside the locking member 33 are electrically connected to a base plate 44 provided within the camera body 12 by a flexible base plate 39.

A code plate 52 is fixed to the bottom side of the rotary dial 32. The base plate 44 includes a pair of brushes 72 and 78 adapted to contact with code plate 52. The code plate 52 cooperates with the brushes 72 and 78 to constitute a switch which detects the direction in which the rotary dial 32 is rotated.

Figure 4:
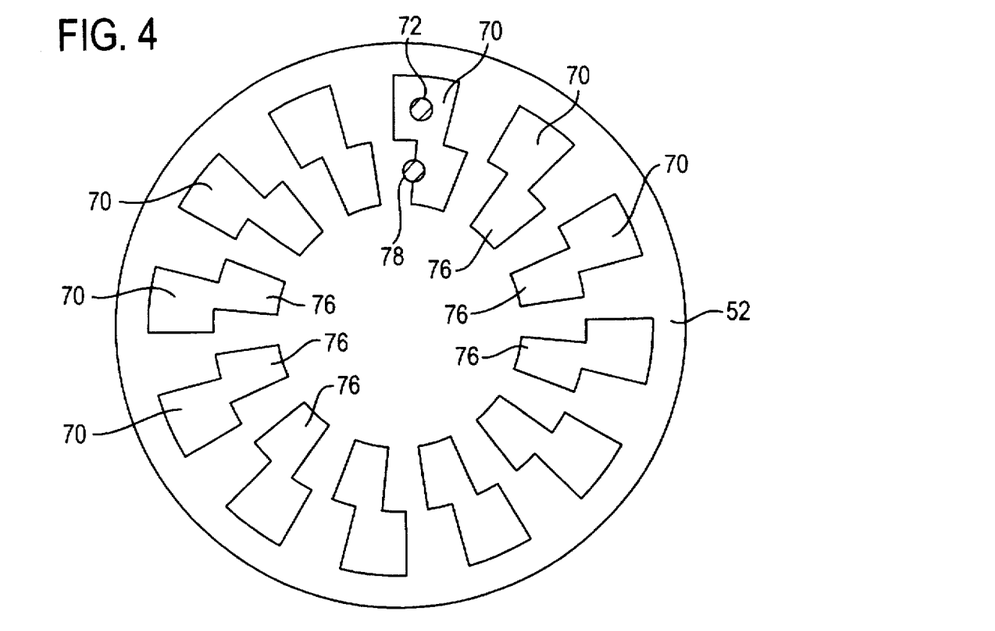
FIG. 4 is a plan view of a code plate fixed to the rotary dial.

Referring to FIG. 4, the code plate 52 is a disc made of an insulative material, on which outer and inner rows of electrically conductive patterns 70 and 76 are circumferentially arranged at regular intervals. Specifically, the conductive patterns 70 and 76 belonging to the respective rows are defined by sectors, each having an angular width of 15° around the center of the code plate. Each row comprises twelve such sectors arranged at angular intervals of 15°. The inner and outer rows of the patterns are arranged with a phase difference of 7.5° and are electrically connected to each other at portions where the phases overlap each other.

The first and second brushes 72 and 78 are aligned with each other in a radial direction line are brought into respective contact when the outer and inner conductive patterns 70 and 76 overlap each other. All of the conductive patterns 70 and 76 are grounded, and timing of a change occurring in the conductive relationship between the respective brushes 72 and 78 and the ground detects the direction in which the rotary dial 32 is being rotated.

While this embodiment is described as utilizing a relative change in the angular position of the rotary dial 32 as information, it is also possible, without departing from the scope of the invention, to provide an arrangement such that an absolute coordinate of the angular position may be utilized as useful information based on the patterns of the code plate 52 as the absolute codes by increasing the number of brushes.

Figure 5:
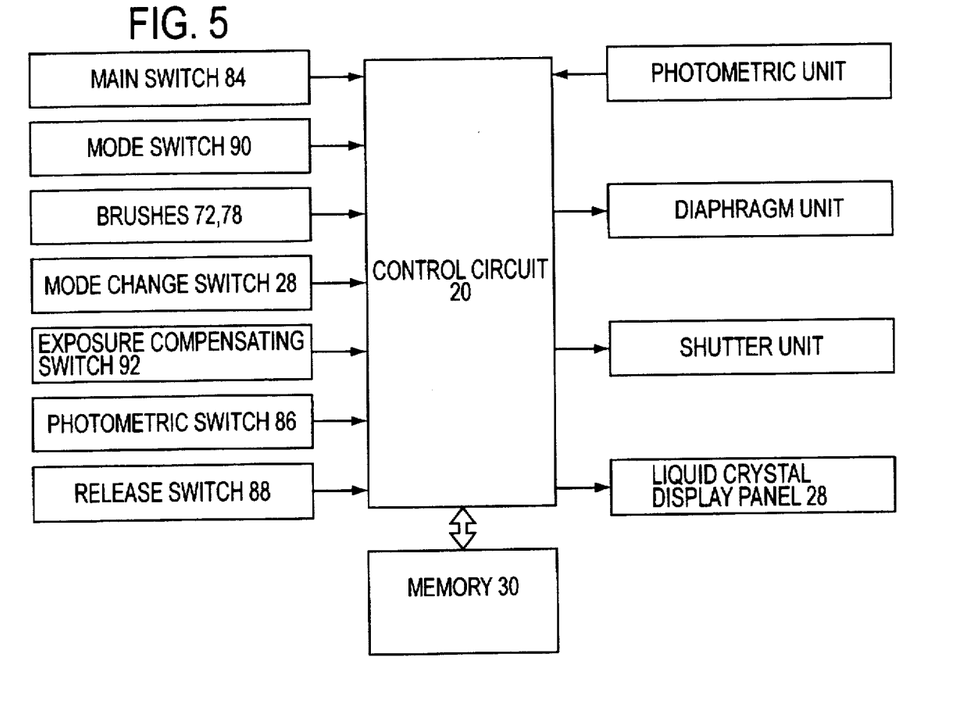
FIG. 5 is a block diagram showing a control circuit provided in the camera.

Referring now to FIG. 5, the circuit arrangement of a control unit in the illustrated embodiment of an information setting and displaying device will be described. It should be understood that FIG. 5 is a simplified block diagram showing only the principle parts for controlling the display extracted from the complete control circuit of the camera.

A control circuit 20 is responsive to information input from various switches, e.g., photometric information input from a photometric unit and film sensitivity information input from a film sensitivity detector circuit (not shown), to control various e.g., as a diagram unit contained within the photographic taking lens 14, a shutter unit and the liquid crystal display panel 28.

Switches connected to the control circuit 20 include: a main switch 84, which is turned ON as the main switch 16 provided on the camera body 12 is slidably moved to the ON position; a mode switch 90, which is turned ON as the mode button 24 is depressed; a rotational direction switch comprising the code plate 52 of the rotary dial 32 and the brushes 72 and 78 provided in contact with this code plate 52; a mode change switch 82, which is turned ON as the mode change button 34 is depressed; an exposure compensating switch 92, which is turned ON as the exposure compensating button 26 is depressed; a photometric switch 86, which is turned ON as the release button 22 is half-depressed; and a release switch 88, which is turned ON as the release button 22 is fully depressed.

A storage means in the form of a memory 30 is also connected to the control circuit 20. The memory 30 stores various predetermined values used by the control circuit 20 to calculate exposure or the like, and data for display in the respective display sub-areas of the liquid crystal display panel 28 in the form of tables associated with respective pointers. The control circuit 20 controls setting of compensated exposure value, shutter speed and diaphragm stop so that, during the actual operation of displaying, it reads the data to be displayed from the tables stored in the memory 30.

The tables include an Xv display table used for display relating to exposure compensation, a Tv display table used for display relating to shutter speed setting, and an Av display table used for display relating to diaphragm stop setting. The contents of these tables are shown in the following tables.

TABLE 1

| Pointer | Display Data | ▼ Display | ▲ Display |
|---|---|---|---|
| −3.5 | OFF(blank) | ON | OFF(blank) |
| −3.0 | −3.0 | ON | ON |
| −2.5 | −2.5 | ON | ON |
| −2.0 | −2.0 | ON | ON |
| −1.5 | −1.5 | ON | ON |
| −1.0 | −1.0 | ON | ON |
| −0.5 | −0.5 | ON | ON |
| 0.0 | 0.0 | ON | ON |
| 0.5 | 0.5 | ON | ON |
| 1.0 | 1.0 | ON | ON |
| 1.5 | 1.5 | ON | ON |
| 2.0 | 2.0 | ON | ON |
| 2.5 | 2.5 | ON | ON |
| 3.0 | 3.0 | ON | ON |
| 3.5 | OFF(blank) | OFF(blank) | ON |

TABLE 2

| Pointer | Display Data | ▼ Display | ▲ Display |
|---|---|---|---|
| −5.5 | OFF(blank) | ON | OFF(blank) |
| −5.0 | 30" | ON | ON |
| −4.5 | 20" | ON | ON |
| −4.0 | 15" | ON | ON |
| −3.5 | 10" | ON | ON |
| −3.0 | 8" | ON | ON |
| 9.0 | 500 | ON | ON |
| 9.5 | 750 | ON | ON |
| 10.0 | 1000 | ON | ON |
| 10.5 | 1500 | ON | ON |
| 11.0 | 2000 | ON | ON |
| 11.5 | OFF(blank) | OFF(blank) | ON |

TABLE 3

| Pointer | Display Data | ▼ Display | ▲ Display |
|---|---|---|---|
| −0.5 | OFF(blank) | ON | OFF(blank) |
| 0.0 | F1.0 | ON | ON |
| 0.5 | F1.2 | ON | ON |
| 1.0 | F1.4 | ON | ON |
| 1.5 | F2.0 | ON | ON |
| 2.0 | F2.5 | ON | ON |
| 11.0 | F45 | ON | ON |
| 11.5 | F54 | ON | ON |
| 12.0 | F64 | ON | ON |
| 12.5 | F76 | ON | ON |
| 13.0 | F90 | ON | ON |
| 13.5 | OFF(blank) | OFF(blank) | ON |

The above tables represent values which can be set by the camera. In the fields beyond the maximum value and the minimum value, the tables contain the blank display (i.e., power OFF) data. Accordingly, the blank display occurs in the first and second proposed value display sub-areas when the currently set values are either the maximum value or the minimum value.

The method by which the information setting and displaying device of the present invention operates will be explained to the reference with flow charts illustrated in FIGS. 6 through 10. The respective processing routines are executed by the control circuit 20.

Figure 6:
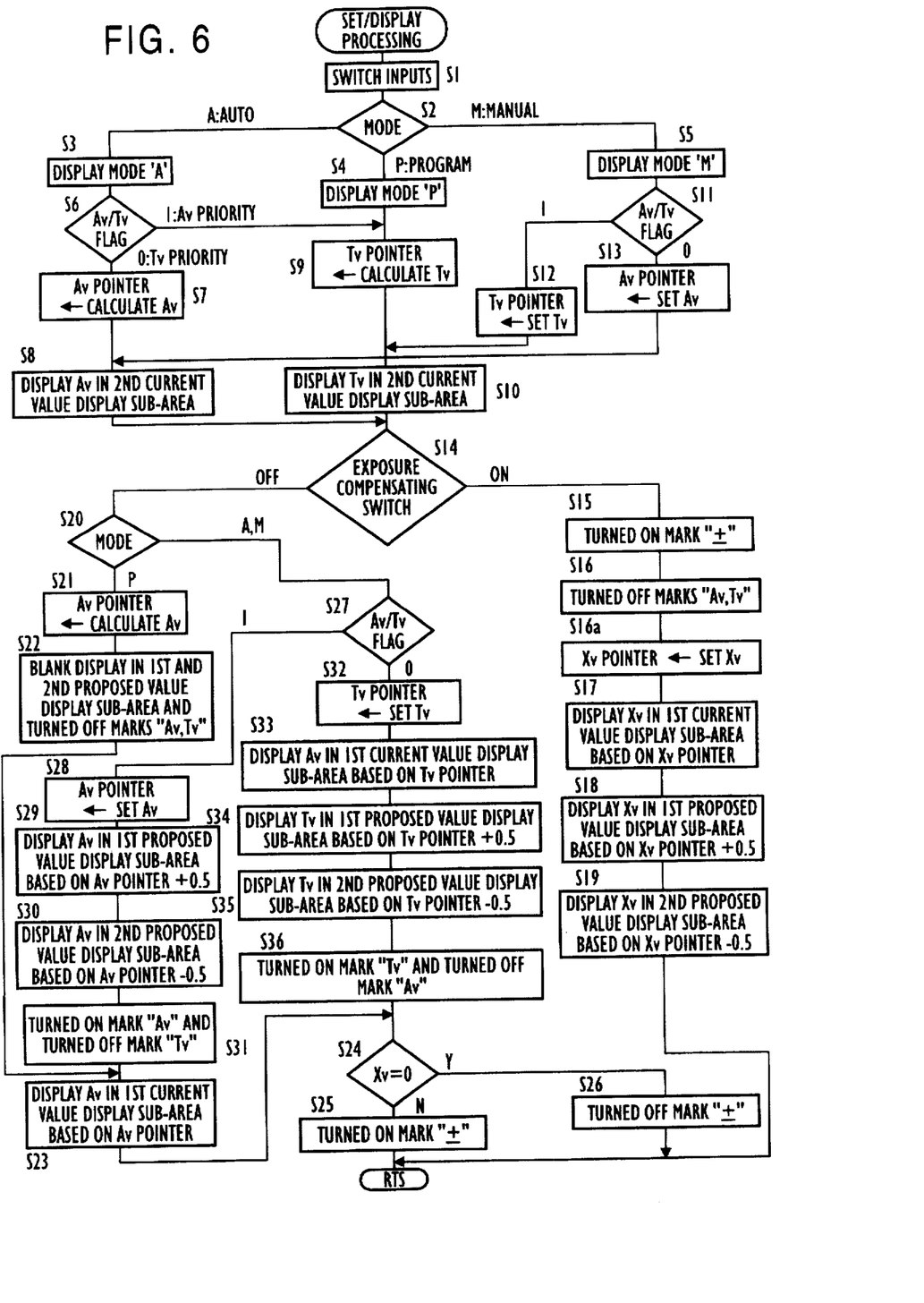
FIG. 6 is a flow chart showing a routine of setting and displaying processing executed by the control circuit.

FIG. 6 is a main flow chart illustrating a routine of setting and displaying. According to this routine, steps S1 through S13 generally relate to displaying data in the third display panel 28C; and steps S14 through S36 generally relate to displaying data in the first and second display panels 28A and 28B.

In Step S1 respective switches are checked perform data input which are then identified during step S2.

According to the specific mode identified by step S2, one of AUTO "A", PROGRAM "P", or MANUAL "M" is displayed in the mode display sub-area 28g of the third display panel 28C (steps S3 through S5).

In the AUTO (A) mode with priority given to Tv, the Av pointer is set to a digital value corresponding to an Av value obtained by exposure calculation. An appropriate display data read from the Av table stored in the memory on the basis of the Av pointer, and displayed in the second current value display sub-area 28f of the third display panel 28c (steps S6 through S8). It should be understood that the term "exposure calculation" used herein is the calculation in which an exposure value is determined from various parameters such as the object to be photographed, an ISO speed, a shutter speed, and as a diaphragm stop.

In the AUTO (A) mode with priority given to Av, the Tv pointer is set to a digital value corresponding to a Tv value obtained from exposure calculation. Appropriate display data is read from the Tv table stored in the memory on the basis of the Tv pointer, and displayed in the second current value display sub-area 28f (steps S9 and S10).

The state of AvTv flag indicates whether priority is given to Tv or Av. The AvTv flag is alternately switched between 0 and 1 as the mode change button 34 is turned ON/OFF in AUTO or MANUAL mode.

In the MANUAL (M) mode with priority given to Av, the Tv pointer is set to a digital value corresponding to a manually set Av value (steps S11 through S13). The data read from the appropriate table stored in the memory on the basis of the associated pointer is displayed in the second current value display sub-area 28f (steps S8 and S10) in the same manner as in the AUTO mode.

Step S14 detects the ON/OFF state of the exposure compensating switch 92. If the switch 92 is detected to be in the ON-state, the mark "±" is displayed in the exposure compensation mark display sub-area 28e of the second display panel 28B, and the display in the exposure mode display sub-area 28d is cleared (step S16). Then, step S16a sets the Xv pointer to a digital value corresponding to the current set Xv value. Based on this Xv pointer, appropriate display data is read from the Xv display table and displayed in the first current value display sub-area 28a of the first display panel 28A (step S17).

Subsequently, based on a value corresponding to the Xv pointer plus 0.5, appropriate display data is read from the Xv display table and displayed in the first proposed value display sub-area 28b (step S18).

Next, based on a value corresponding to the Xv pointer minus 0.5, appropriate display data is read from the Xv display table and displayed in the second proposed value display sub-area 28c (step S19).

If the exposure compensating switch 92 is detected by step S14 to be in the OFF-state, the routine proceeds to step S20 to determine the photographing mode of the camera. If the photographing mode is determined by step S20 to be in the PROGRAM mode, the Av pointer is set to a value corresponding to the calculated Av value (step S21), the first and second proposed value display sub-areas 28b and 28c are made blank, the mark in the exposure mode display sub-area 28d of the second display panel 28B is turned off (step S22), and display data read from the Av display table on the basis of said Av pointer set by step S21 is displayed in the first current value display sub-area 28a (step S23).

Finally, the mark "±" in the exposure compensation mark display sub-area 28e is turned ON when the exposure compensation value is not equal to 0. Similarly this mark is turned OFF when the exposure compensation value=0 (steps S24 through S26).

In the AUTO or MANUAL mode with priority given to Av, the Av pointer is set to a value corresponding to the manually set Av value (step S28). Based on a value corresponding to this Av pointer plus 0.5, appropriate display data is read from the Av display table and displayed in the first proposed value display sub-area 28b (step S29).

Then, based on a value corresponding to the Av pointer minus 0.5, Appropriate display data is read from the Av display table and displayed in the second proposed value display sub-area 28c (step S30).

The mark "Av" in the exposure mode display sub-area 28d is turned on and the mark "Tv" is turned off (step S31). A current value is then displayed in the first current value display sub-area 28a on the basis of the set Av pointer (step S23).

In the AUTO or MANUAL mode with priority given to Tv, the Tv pointer is set to a value corresponding to the manually set Tv value (step S32). Based on this Tv pointer, an appropriate display data is read from the Tv display table and displayed in the first current value display sub-area 28a (step S33).

Then, based on a value corresponding to the Tv pointer plus 0.5, Appropriate display data is read from the Tv display table and displayed in the first proposed value display sub-area 28b (step S34).

Next, based on a value corresponding to the Tv pointer minus 0.5, appropriate display data is read from the Tv display table and displayed in the second proposed value display sub-area 28c (step S35).

Now the mark "Tv" in the exposure mode display sub-area 28d is simultaneously turned on when the mark "Av" is turned off (step S36). The exposure compensation mark turn on or off in Steps S24–S26.

Figure 7:
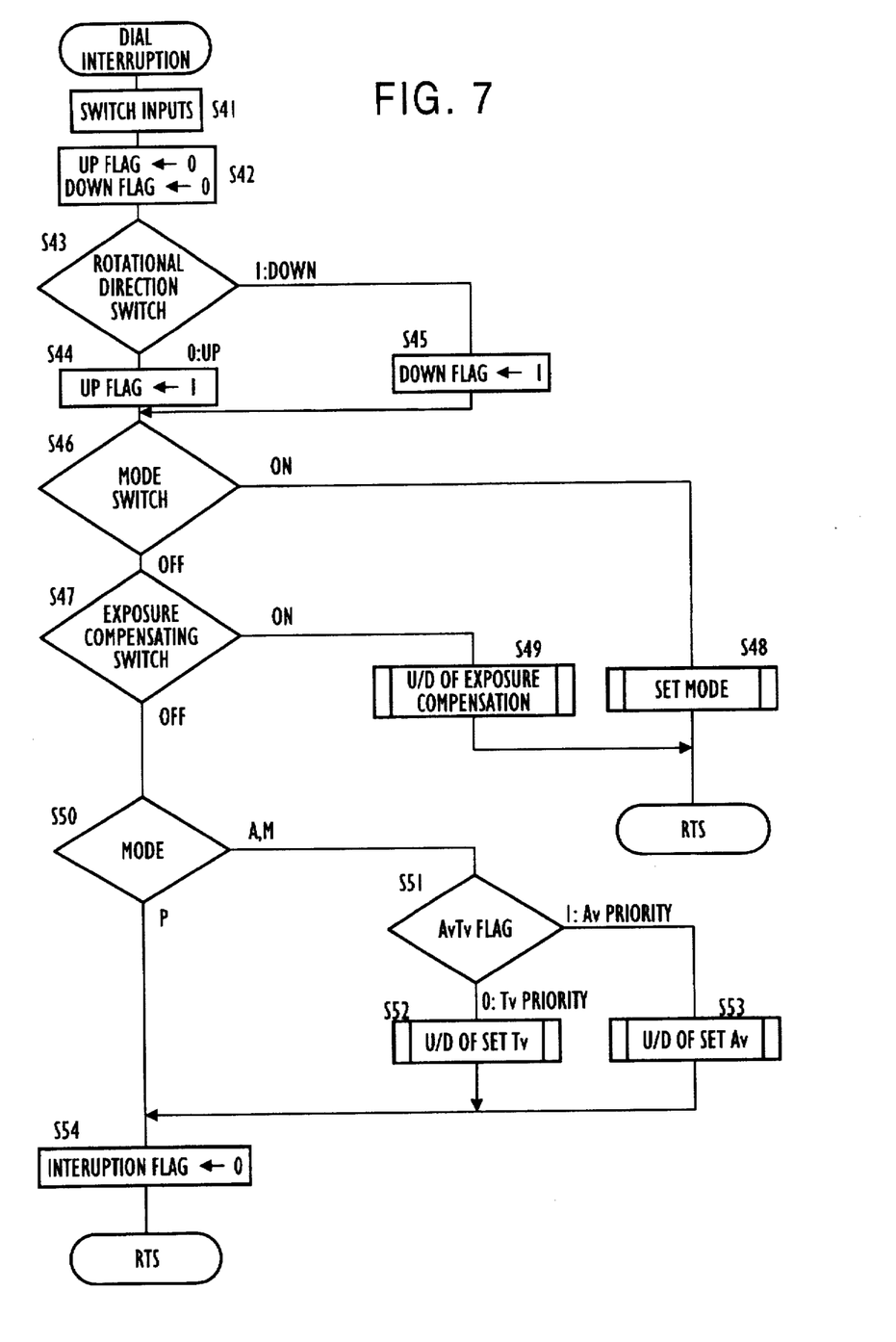
FIG. 7 is a flow chart showing a routine of dial interruption processing run by the control circuit.

Next, a dial interruption handling routine run during operation of the rotary dial 32 will be discussed in reference with a flow chart of FIG. 7. More specifically, such handling is run during a rise time of the signal provided from the rotational direction switch.

Upon occurrence of interruption, the states of the respective switches are input to the control circuit, and the UP and DOWN flags are cleared (steps S41 and S42). A direction in which the rotary dial 32 has been rotated is detected from a state of the rotational direction switch. The UP flag is set to 1 if the rotary dial 32 has been rotated in the UP-direction (i.e., clockwise) and the DOWN flag is set to 1 if the rotary dial 32 has been rotated in the DOWN-direction (counterclockwise) (steps S43 through S45).

Steps S46 and S47 detect states of the mode switch 90 and the exposure compensating switch 92, respectively.

If the mode switch 90 is ON, step S48 executes operation of mode setting. If the mode switch 90 is OFF while the exposure compensating switch 92 is ON, step S49 executes UP-DOWN processing of exposure compensation. For the operation of mode setting, the rotary dial 32 is rotated with the mode switch 90 held in its ON state. The photographing mode is thereby switched among three modes, i.e., PROGRAM mode, AUTO mode and MANUAL mode.

It is now assumed that the mode switch 90 and the exposure compensating switch 92 are OFF and the photographing mode is AUTO or MANUAL. If the exposure mode with priority given to the shutter is selected, UP-DOWN processing of the set Tv as will be described below is executed. If the exposure mode with priority given to the diaphragm is selected, UP-DOWN processing of the set diaphragm stop value is executed and the interruption flag is cleared, and the routine returns to the step prior to the interruption (steps S50 through S54).

In the PROGRAM mode, both Av and Tv are automatically set by the camera and no manual setting is required. Therefore no UP-DOWN processing of Tv and Av is executed and the routine returns to the step prior to the interruption immediately after the interruption flag is cleared.

Figure 8:
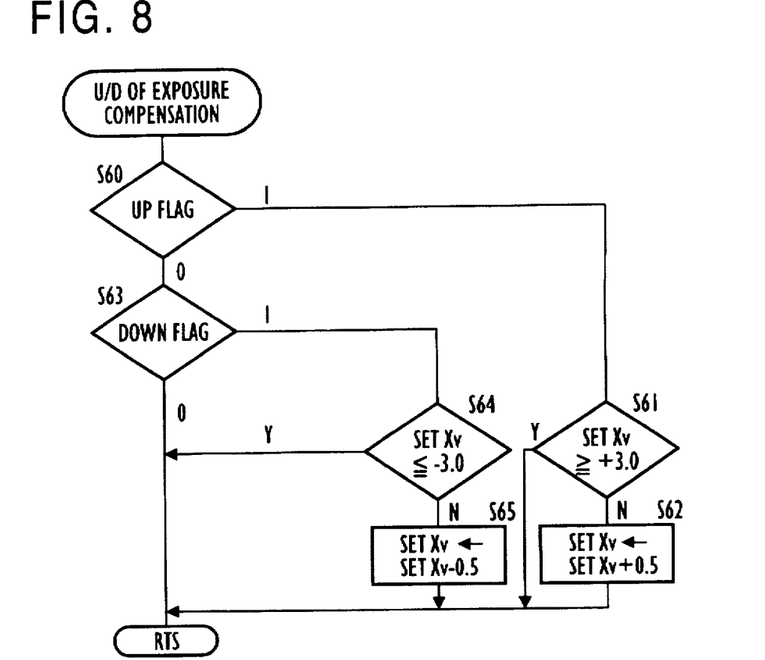
FIG. 8 is a flow chart showing a routine of exposure compensation U/D processing executed during the dial interruption processing.
Figure 9:
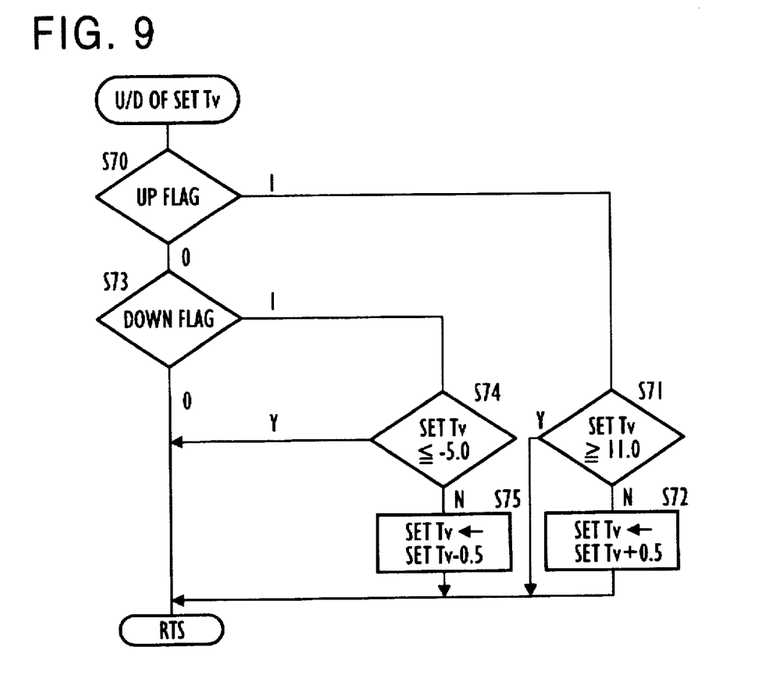
FIG. 9 is a flow chart showing a routine of set Tv U/D processing executed during the dial interruption processing.
Figure 10:
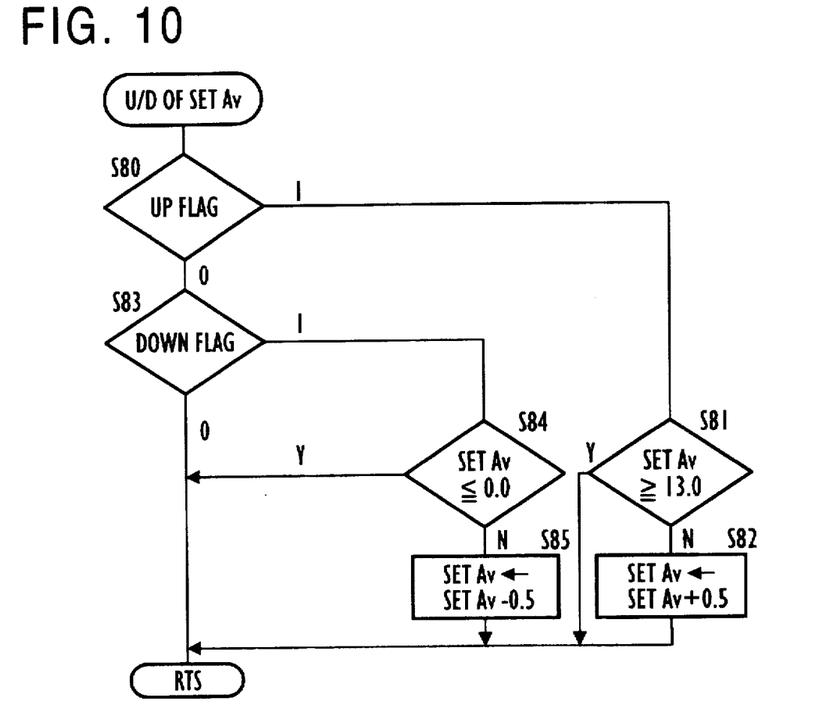
FIG. 10 is a flow chart showing a routine of set Av U/D processing executed during the dial interruption processing.

FIGS. 8 through 10 illustrate respective UP-DOWN processing executed during the previously described step of dial interruption.

In the UP-down processing of exposure compensation illustrated by a flow chart of FIG. 8, 0.5 is added to the set value of Xv (steps S50 through S52) if the UP flag is set to 1 and the current set value of Xv is not higher than the upper limit value of 3.0. Furthermore, 0.5 is substracted from the set value of Xv (steps S60, S63, S64, S65) and the set value of Xv is reset if the DOWN flag is set to 1 and the current set value of Xv is not less than the lower limit value of −3.0.

When the current set value of Xv has reached the upper or lower limit value, the routine returns to the step of dial interruption even if the UP flag or the DOWN flag are detected to be set to 1, respectively.

In the UP/DOWN processing shown by FIG. 9, the set value of Tv is UP/DOWN processed with an increment of 0.5 between an upper limit value of +11.0 and a lower limit value of −5.0 in a manner similar to the case shown by FIG. 8 (steps S70 through S75).

In the UP/DOWN processing shown by FIG. 10, the set value of Av is UP/DOWN processed with an increment of 0.5 between an upper limit value of 13.0 and a lower limit value of 0.0 in a manner similar to the case shown by FIG. 8 (steps S80 through S85).

Figure 11:
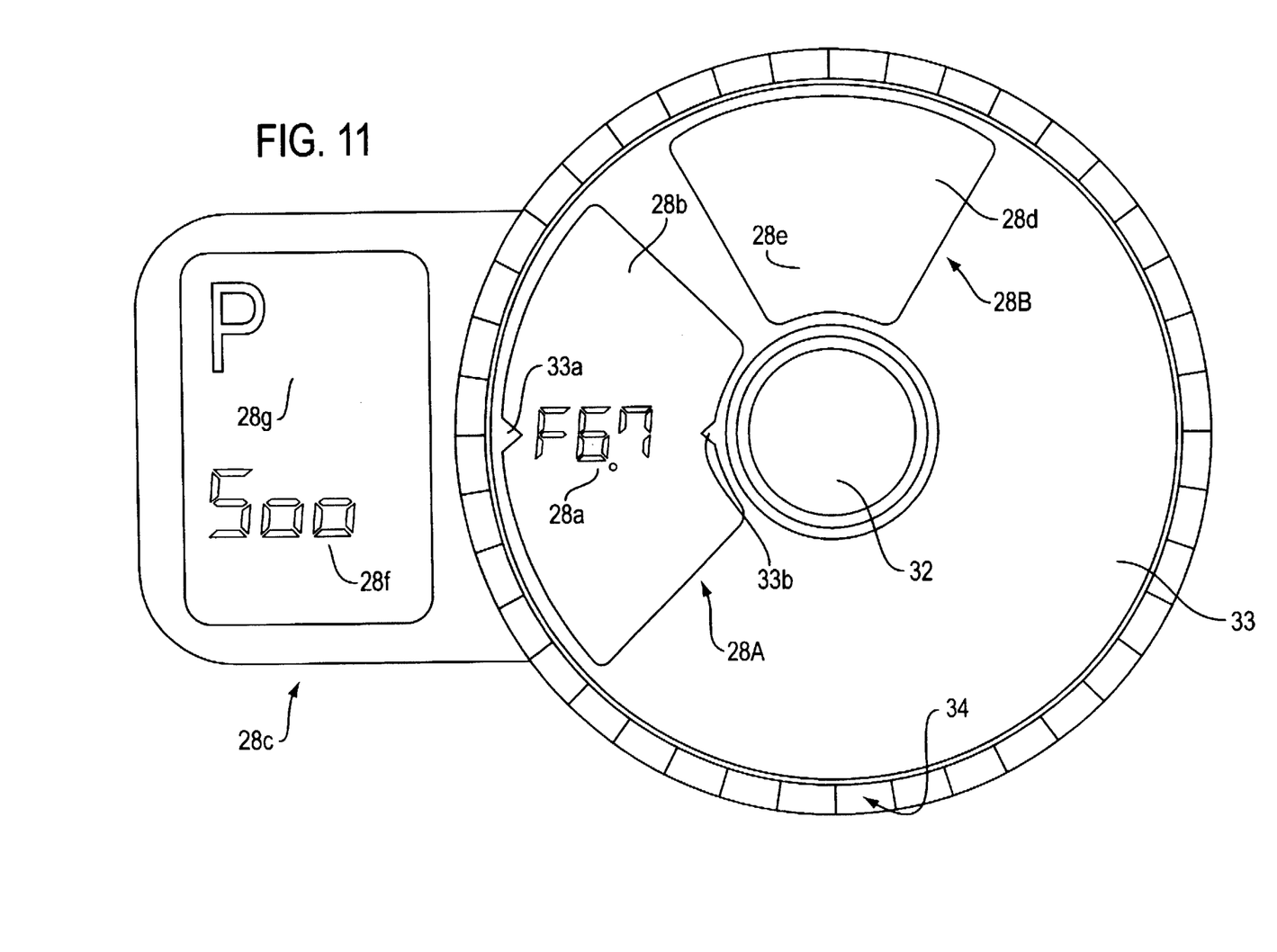
FIG. 11 is a diagram showing one example of a display in the PROGRAM mode.

Several specific examples of the display on the liquid crystal display panel 28 under the above control will now be described. FIG. 11 shows such a display occurring when the camera is in PROGRAM mode and the exposure compensating switch 92 is in OFF-state. In this case, the display comprises "P" representing the PROGRAM mode in the photographing mode display sub-area 28g, "500" representing a shutter speed (i.e., ⅟₅₀₀ sec.) in the second current value display sub-area 28f, and a diaphragm stop value "F 6.7" in the first current value display sub-area 28a.

In the PROGRAM mode, the shutter speed and the diaphragm stop value have already been provided by the predetermined program chart on the basis of the exposure value Ev and a combination of Tv and Av, cannot be changed by operation of the rotary dial 32. Accordingly, display of the proposed values are meaningless; accordingly the proposed value display sub-areas 28b and 28c as and arrow display sub-areas 28d, 28e are blank.

Figure 12:
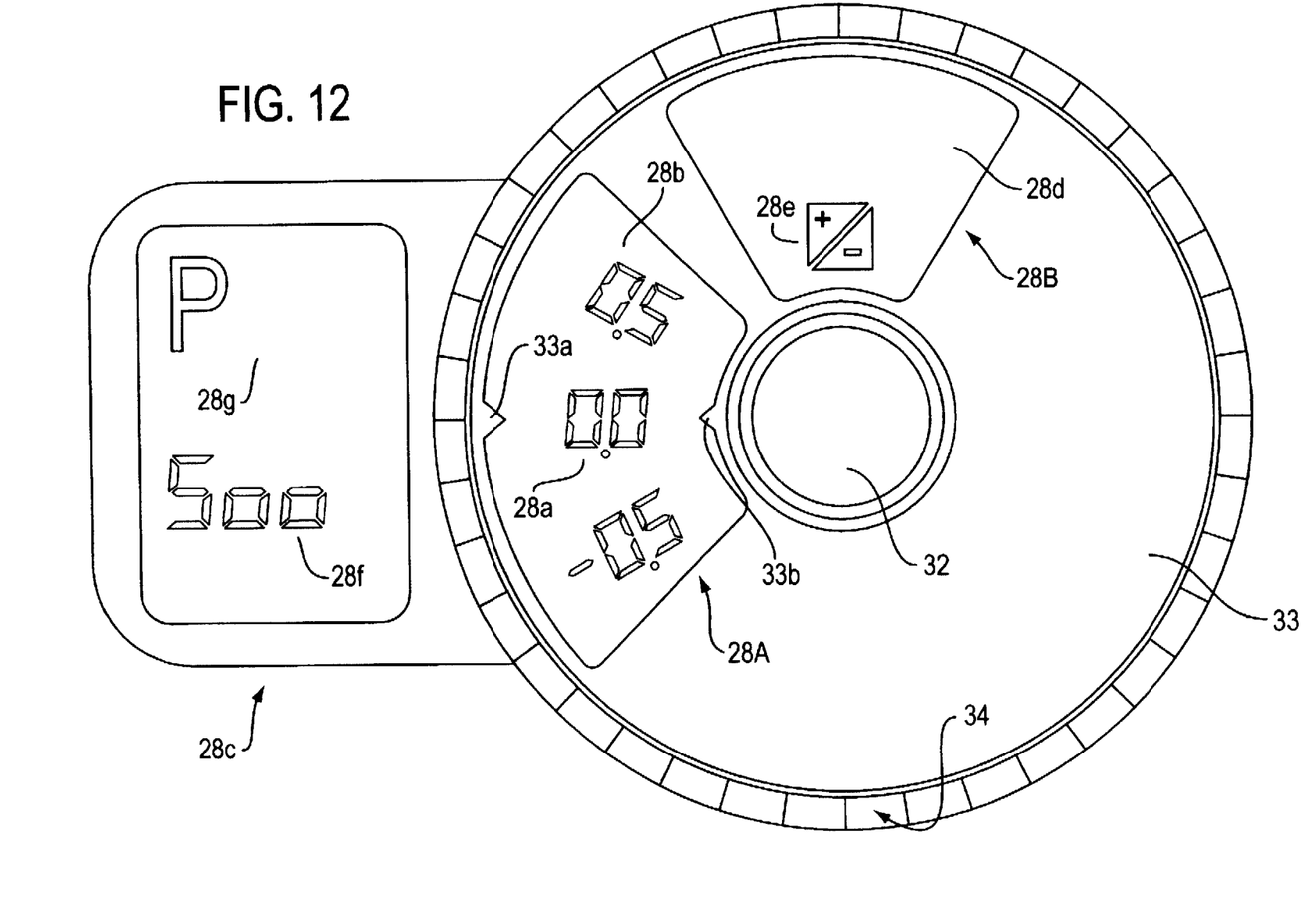
FIG. 12 is a diagram showing one example of display during the exposure compensation in the PROGRAM mode.

FIG. 12 shows a display appearing when the exposure compensating switch 92 is turned ON from the state of FIG. 11. Both the display data in the photographing mode display sub-area 28g and the display data in the second current value display sub-area 28f remain the same; in contrast both the display in the dial display sub-areas 28a through 28c and the display in the exposure compensation mark display sub-area 28e change. In this specific case, the current value of the Xv pointer is 0.0 and the display data "0.0" corresponding to the pointer 0.0 is read from Table 1 and displayed in the first current value display sub-area 28a.

The display data "0.5" is read from the display table on the basis of a value corresponding to the current Xv pointer 0.0 plus 0.5, and displayed in the first proposed value display sub-area 28b. On the other hand, the display data "−0.5" is read from the display table on the basis of a value corresponding to the current Xv pointer 0.0 minus 0.5, and displayed in the second proposed value display sub-area 28c. Additionally, the mark "+" is displayed in the exposure compensation mark display sub-area 28e.

When the rotary dial 32 is rotated counterclockwise by one step from the state of FIG. 12, the current Xv pointer is set to 0.5, the digital values "0.5", "1.0" and "0.0" are displayed in first and second proposed value display sub-areas 28b and 28c, respectively.

Figure 13:
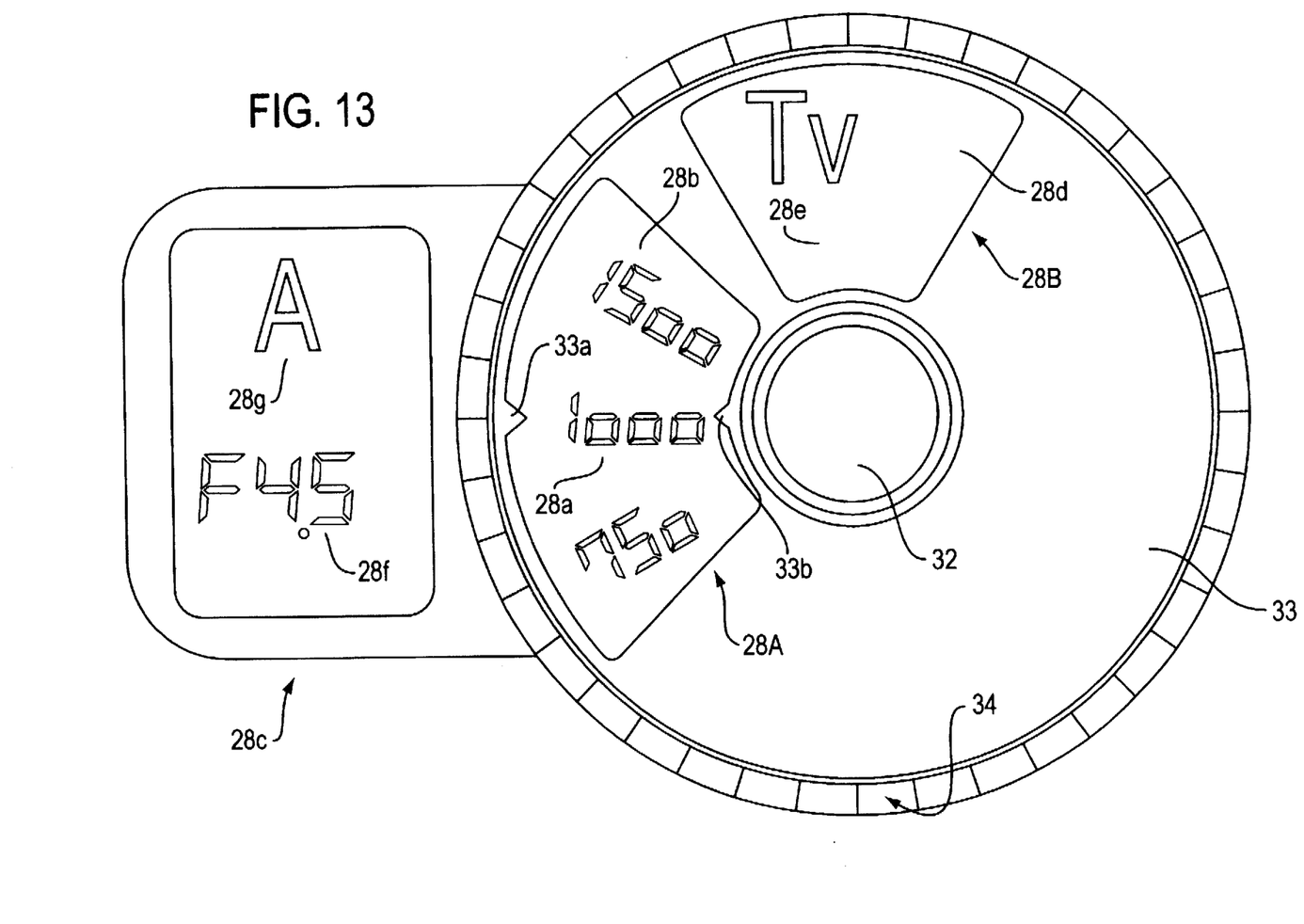
FIG. 13 is a diagram showing one example of display in the AUTO mode with priority given to the shutter; and, FIG. 14 is a diagram showing a variant of the display.

FIG. 13 shows the display appearing in the case of AUTO mode with priority "A" representing the AUTO mode is displayed in the photographing mode display sub-area 28g and the mark "Tv" representing the shutter priority is turned on in the exposure mode display sub-area 28d. With the current Tv pointer set to 10.0, "1000" representing a shutter speed (i.e., ⅟₁₀₀₀ sec) is displayed in the current value display sub-area 28a, "1500" corresponding to the Tv pointer 10.5 is displayed in the first proposed value display sub-area 28b, and "750" corresponding to the Tv pointer 9.5 is displayed in the second proposed value display sub-area 28c.

In the second current value display sub-area 28f, the diaphragm stop value "F 4.5", calculated on the basis of the set value of shutter speed, is displayed.

When the rotary dial 32 is rotated counterclockwise by one step from the state of FIG. 13, the current Tv pointer is set to 10.5, "1500" is displayed in the first current value display sub-area, "2000" is displayed in the first proposed value display sub-area and "1000" is displayed in the second proposed value display sub-area.

Figure 14:
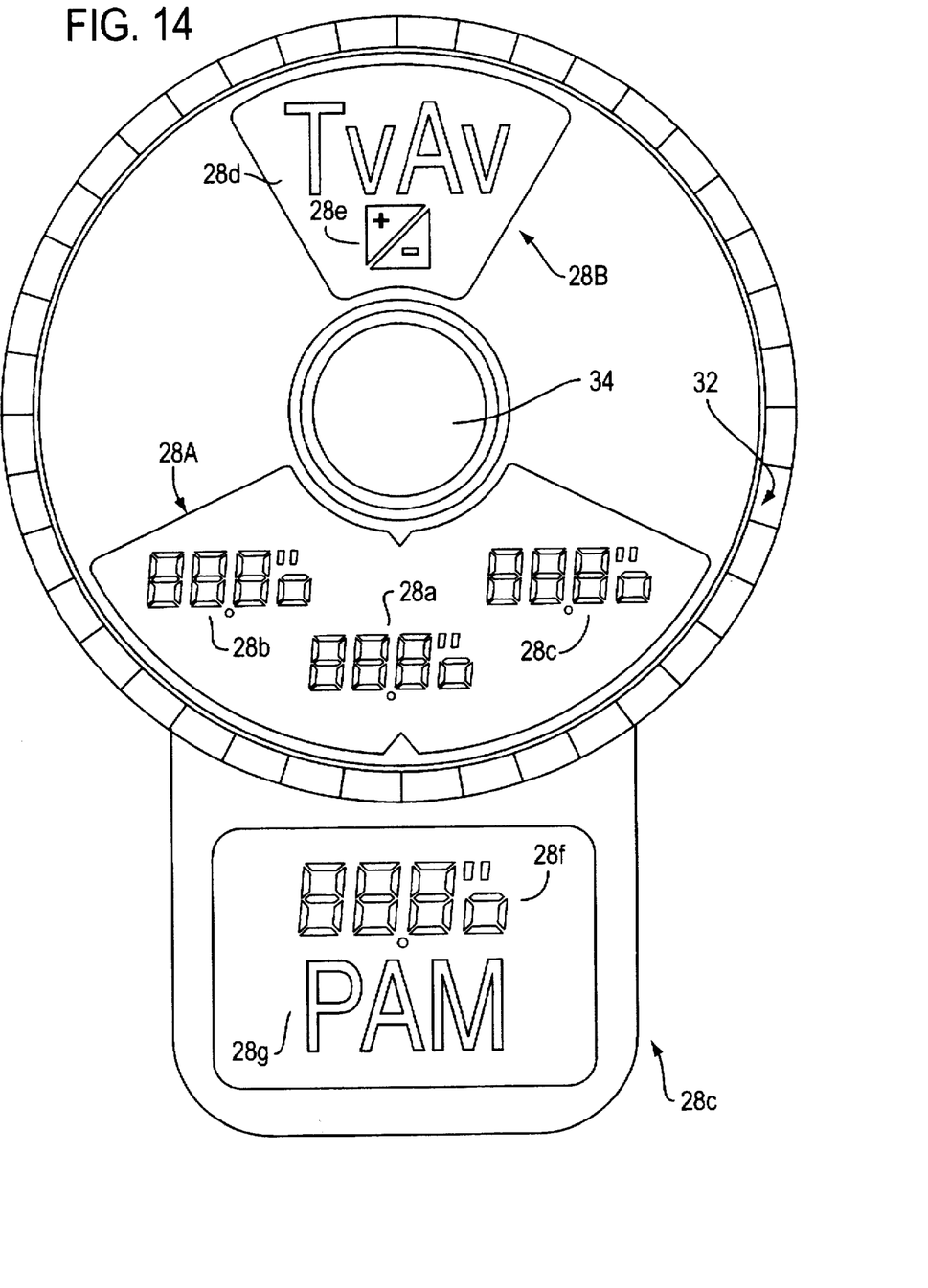

FIG. 14 shows a variation of the display panel 28. According to the variation of FIG. 14, the third display panel 28C, the first display panel 28A and the second display panel 28B are arranged so as to be aligned from the operator's side.

The respective display sub-areas 28a through 28c constituting the dial display area are arranged side by side.

While the information setting and displaying device of the present invention has been described hereinabove as applied to the single-lens reflex camera, it should be understood that the present invention can be applied other various cameras such as a compact camera (lens shutter camera and a video camera.

While the dial display area is provided with three digital value display sub-areas in the above illustrated embodiments an alternative arrangement is also possible in which at least a pair of digital value display sub-areas are provided so that the current value and only one proposed value set by operating the rotary dial is displayed. Furthermore, another arrangement is also possible in which four or more display sub-areas are parallelly provided so that, in addition to the current value, a value set by rotation of the dial by one or two steps, etc. may be displayed.

The information to be displayed in the dial display area may utilize, in addition to the tables containing the digital information described in connection with the illustrated embodiments, other tables containing information other than digital values, for example, letters and symbols.

As will be readily appreciated from the foregoing foregoing description, the invention allows an operator to foreknow how the set values will be changed depending on the direction in which the rotary dial is rotated, since, in addition to a currently set information, other information changed by operation of the rotary dial is displayed in association with the direction in which the rotary dial is rotated (i.e., shutter speed and diaphragm values).

We claim:

1. An information setting and displaying device for a camera, comprising:
    a rotary dial rotatably mounted in an adjustable manner on a camera body;
    a display member including at least first and second display sub-areas arranged successively inside and along in an inner periphery of said rotary dial;
    information setting means for changing information in a predetermined order by operating said rotary dial;
    display control means for electronically displaying a currently set information in said first display sub-area, and for electronically displaying proposed information, to be set as said rotary dial rotates in a direction from said first display sub-area towards said second display sub-area by at least one rotation step, in said second display sub-area; and
    memory means for storing digital information, in the form of digital values tables, said digital information being changeable by operation of said rotary dial, each of said tables containing a plurality of digital values arranged in a predetermined order,
    wherein said information setting means reads proposed information from said memory means, and said display member displays said proposed information.

2. An information setting and displaying device for a camera according to claim 1, wherein said information is digital value data.

3. An information setting and displaying device for a camera according to claim 1, wherein said information includes at least one of a shutter speed, a diaphragm and exposure compensation value.

4. An information setting and displaying device for a camera according to claim 1, wherein said rotary dial mounted on said camera body is rotatable stepwise.

5. An information setting and displaying device for a camera according to claim 1, wherein said display member includes first, second and third display sub-areas arranged in parallel along said direction in which said rotary dial rotate, and said display control means displays a current set information value in said second display sub-area, and reads from said memory means said proposed information to be set by operating said rotary dial towards the first and third display sub-areas, respectively.

6. An information setting and displaying device for a camera according to claim 5, wherein said display control means displays a blank in one of said first and third display sub-areas when an end value in an accessed one of said tables of said memory means is displayed in said second display sub-area, and there is no value to be set as said rotary dial rotates from said second display sub-area toward said one of said first and third display sub-areas.

7. An information setting and displaying device for a camera according to claim 1, wherein said information stored in said memory means comprises at least one of a shutter speed, a diaphragm, and an exposure compensation value.

8. An information setting and displaying device for a camera according to claim 7, wherein said information stored in said memory means comprises at least two groups of information relating to shutter speed, diaphragm, and exposure compensation value, and wherein said setting means and said display control means set and display, an information value of an information group selected by a selector switch provided on said camera body separate from said rotary dial.

9. An information setting and displaying device for a camera according to claim 8, wherein said display control means displays a blank in said second display sub-area when the camera is in a PROGRAM mode and one of said shutter speed and said diaphragm is selected to be displayed by said display member.

10. An information setting and displaying device for a camera according to claim 9, wherein said display sub-areas are arranged in parallel along said direction in which said rotary dial is rotated.

11. An information setting and displaying device for camera according to claim 1, wherein said rotary dial is provided with means for detecting an absolute coordinate of an angular position, of said rotary dial and said setting means sets an information value corresponding to said absolute coordinate detected by said detecting means.

12. An information setting and displaying device for a camera according to claim 1, wherein said rotary dial provides information comprising an absolute coordinate of an angular position of said rotary dial to said setting means and said display control means.

13. An information setting and displaying device for a camera according to claim 1, wherein said display member includes, in addition to said first and second display sub-areas arranged along the direction in which said rotary dial is rotated, at least one additional information display sub-area.

14. The information setting and display device according to claim 1, said display control means changing said proposed information in association with rotation of said rotary dial.

15. An information setting and displaying device for a camera, said device comprising:
    a rotary dial rotatably mounted in an adjustable manner on a camera body;
    a display member including at least first and second display sub-areas arranged successively inside an inner periphery of said rotary dial;
    storage means for storing digital information changeable by operation of said rotary dial, said digital information being stored in the form of digital value tables, each of said tables containing a plurality of digital values arranges in a predetermined order;
    setting means for reading said digital information from said storage means and changing said information in said predetermined order; and
    display means for electronically displaying a current digital information value read by said setting means in said first display sub-area and for electronically displaying, a digital value to be read by said setting means as said rotary dial is rotated in the direction from said first display sub-area toward said second display sub-area, in said second display sub-area, said current digital information and said digital value to be read being adjacent values in one of said digital value tables.

16. The information setting and display device according to claim 15, said display means changing said digital value to be read in association with rotation of said rotary dial.

17. An information setting and displaying device for a camera, comprising:

a ring-like rotary dial rotatably mounted in an adjustable manner on a camera body;

a display member provided inside said rotary dial and including at least first and second display sub-areas arranged in parallel along an inner periphery of said rotary dial;

storage means for storing information changeable by operating said rotary dial, in the form of a plurality of tables, each of said plurality of tables containing a plurality of values arranged in a predetermined order;

means for electronically setting said information by operating said rotary dial; and, display control means for continuously displaying a currently set information value of an associated one of said tables in said first display sub-area, and for continuously displaying an information value directly adjacent to the current value in the associated one of said tables in said second display sub-area so that said information value displayed in the first display sub-area is transferred to the second display sub-area along said direction in which said rotary dial rotates.

18. An information setting and displaying device for a camera, comprising:

a ring-like rotary dial rotatably mounted in an adjustable manner on a camera body;

a display member provided inside said rotary dials and including at least first and second display sub-areas arranged in parallel along an inner periphery of said rotary dial;

storage means for storing information changeable by operating said rotary dial, in the form of tables, each of said tables containing a plurality of values arranged in a predetermined order;

setting means electronically for setting said information by operating said rotary dial; and, display control means for displaying a currently set information value in said first display sub-area, reading from said storage means an information value to be set as said rotary dial rotates from said second display sub-area toward said first display sub-area, and displaying said information value to be set in said second display sub-area.

19. An information setting and displaying device for a camera according to claim 18, wherein said display member further includes proposed value display sub-areas on both sides of said first display sub-area.

20. A photographic information setting and display device for a camera, comprising:

a rotary dial step-wise rotatably mounted on a camera body;

a display, mounted on said rotary dial, and including at least first and second display sub-areas;

a memory with a plurality of discreet values stored in a sequence; and a display control that continuously electronically displays a currently set one of said plurality of discreet values in said first display sub-area and that continuously displays another of said plurality of discreet values, which is adjacent said one of said plurality of discreet values in said sequence, in said second display sub-area;

wherein said another of said plurality of discreet values is displayed in said first display sub-area responsive to rotation of said dial in a direction from said second display sub-area towards said first display sub-area.

21. The information setting and display device of claim 20, wherein said another of said plurality of discreet values is displayed in said first display sub-area responsive to clockwise rotation of said dial, and said one of said plurality of discreet values is displayed in said second display sub-area responsive to counter-clockwise rotation of said dial.

22. The information setting and display device of claim 20, wherein said another of said plurality of discreet values is displayed in said first display sub-area responsive to counterclockwise rotation of said dial, and said one of said plurality of discreet values is displayed in said second display sub-area responsive to clockwise rotation of said dial.

23. The information setting and display device of claim 20, wherein said display control displays a blank in at least one of said first and second display sub-areas when said one of said plurality of discreet values is at an end of said sequence.

24. The information setting and display device of claim 20, wherein said rotary dial comprises a fixed circular member having a rotatable ring mounted thereabout, and said display is mounted on said fixed circular member.

25. An information setting and display device for a camera, comprising:

a rotary dial step wise rotatably mounted on a camera body;

a display mounted on said dial, and including first, second, and third display sub-areas;

a memory, a plurality of discreet values in a sequence stored in said memory; and a display control that electronically displays first, second, and third sequentially adjacent values of said plurality of discreet values in said first, second, and third display sub-areas, respectively, said second adjacent value representing a current setting of said camera;

wherein said first adjacent value is displayed in said second display sub-area responsive to rotation of said dial in a direction from said first display sub-area towards said second display sub-area, and wherein said third adjacent value is displayed in said second display sub-area responsive to rotation of said dial in a direction from said third display sub-area towards said second display sub-area.

26. The information setting and display device of claim 25, wherein said first adjacent value is displayed in said second display sub-area responsive to clockwise rotation of said dial, and said third adjacent value is displayed in said second display sub-area responsive to counterclockwise rotation of said dial.

27. The information setting and display device of claim 26, wherein said second adjacent value is displayed in said first display sub-are responsive to counterclockwise rotation of said dial, and in said third display sub-area responsive to clockwise rotation of said dial.

28. The information setting and display device of claim 25, wherein said display control displays a blank in said first display sub-area when said second adjacent value is at a first end of said sequence, and displays a blank in said third display sub-area when said second adjacent value is at a second end of said sequence.

29. The information setting and display device of claim 25, wherein said rotary dial includes a circular member and a rotatable ring member mounted thereabout, said display being mounted on said circular member.

* * * * *